US011713037B2

(12) United States Patent
Chen et al.

(10) Patent No.: US 11,713,037 B2
(45) Date of Patent: Aug. 1, 2023

(54) CONTROLLING OF A DUAL-PROCESSORS TYPE ELECTRICAL PARKING DEVICE IN EVENT OF EMERGENCY BRAKING (71) Applicant: GAC AION NEW ENERGY AUTOMOBILE CO. LTD, Guangdong (CN)

(72) Inventors: Zhensheng Chen, Guangdong (CN); Dan Wei, Guangdong (CN); Binbin Yue, Guangdong (CN); Jinhang Wang, Guangdong (CN)

(73) Assignee: GAC AION NEW ENERGY AUTOMOBILE CO. LTD, Guangzhou (CN)

( * ) Notice: Subject to any disclaimer, the term of this patent is extended or adjusted under 35 U.S.C. 154(b) by 0 days.

(21) Appl. No.: 16/330,777

(22) PCT Filed: Oct. 22, 2018

(86) PCT No.: PCT/CN2018/111275
§ 371 (c)(1),
(2) Date: Mar. 6, 2019

(87) PCT Pub. No.: WO2019/119957
PCT Pub. Date: Jun. 27, 2019

(65) Prior Publication Data
US 2021/0323536 A1  Oct. 21, 2021

(30) Foreign Application Priority Data

Dec. 20, 2017 (CN) .......................... 201711388114.8

(51) Int. Cl.
*B60W 30/06* (2006.01)
*B60R 16/023* (2006.01)
*B60T 7/12* (2006.01)

(52) U.S. Cl.
CPC ........... *B60W 30/06* (2013.01); *B60R 16/023* (2013.01); *B60T 7/12* (2013.01)

(58) Field of Classification Search
CPC ......... B60W 30/06; B60R 16/023; B60T 7/12
See application file for complete search history.

(56) References Cited

U.S. PATENT DOCUMENTS

| 10,315,631 B2 * | 6/2019 | Sautter ................. B60T 13/741 |
| 2007/0249465 A1 | 10/2007 | Barber et al. | |
| 2011/0074204 A1 * | 3/2011 | Kim .......................... B60L 7/12 |
| | | 303/3 |

FOREIGN PATENT DOCUMENTS

| CN | 104842982 A | 8/2015 |
| CN | 107187435 A | 9/2017 |

(Continued)

OTHER PUBLICATIONS

English Translation of Publication No. CN 107187435 A Author: Feng et al. Title: Electrical parking system and parking method capable of meeting automatic driving requirement Date: Sep. 22, 2017 (Year: 2017).*

(Continued)

*Primary Examiner* — James J Lee
*Assistant Examiner* — Steven Vu Nguyen
(74) *Attorney, Agent, or Firm* — ScienBiziP, P.C.

(57) ABSTRACT

The present disclosure relates to an electrical parking control method and device, a readable storage medium and a computer device. The method includes that: when it is detected that a vehicle is in a self-piloting mode and a preset parking control condition is satisfied, a parking switching request message is generated, and sent to a VCU; a parking switching message fed back by the VCU is received, the parking switching message being a message generated when the VCU detects that a vehicle state is executable parking switching; a parking switching signal corresponding to the (Continued)

parking switching message is generated; and the parking switching signal is pushed to an external Electrical Park Brake (EPB) system, the parking switching signal being used to switch a state of the external EPB system, the state including a tightening state and a releasing state.

10 Claims, 4 Drawing Sheets

(56) References Cited

FOREIGN PATENT DOCUMENTS

| | | |
|---|---|---|
| CN | 107444395 A | 12/2017 |
| DE | 102010055921 A1 | 8/2011 |
| JP | 5289150 B2 | 9/2013 |

OTHER PUBLICATIONS

English Translation of Publication No. CN 103863293 A Author: Ye et al. Title: Vehicle parking braking system and control method for same Date: Jun. 18, 2014 (Year: 2014).*

English Translation of Publication No. CN 107015489 A Author: Zhang et al. Title: Brake control method and system for vehicle Date: Aug. 4, 2017 (Year: 2017).*

* cited by examiner

CONTROLLING OF A DUAL-PROCESSORS TYPE ELECTRICAL PARKING DEVICE IN EVENT OF EMERGENCY BRAKING

TECHNICAL FIELD

The present disclosure relates to the technical field of smart automobile control, and more particularly to an electrical parking control method and device, a computer-readable storage medium and a computer device.

BACKGROUND

With the development of smart automobile technology, modern automobiles have become more and more widely used in mechanical control electronization. From basic electrical direction power-assisted steering to complex active steering proportional control, which are mainly hydraulic and mechanical control, tend to electrical control gradually. The modern automobiles require intelligentization in all functions, and those parts which can be mainly controlled by the driver through a direct mechanically connection have been decreasing. An automatic electrical parking function is an important function of a smart automobile, which is implemented by an Electrical Park Brake (EPB) system. Compared with a traditional parking brake, the EPB system has the advantages of convenient, reliable and compact parking, and can realize a vehicle auxiliary starting function.

The existing EPB system requires the driver to perform a parking operation, such as an operation of pressing a parking switch by the driver, and parking is performed by a pull-lock execution mechanism under the EPB control, thereby realizing electrical parking. The existing EPB control has a limited degree of intelligence, the driver is required to perform manual operations, the parking efficiency is low, and it is impossible to solve the parking problem of a pilotless automobile with higher safety requirements.

SUMMARY

In view of this, it is necessary to provide, for the above problem, an electrical parking control method and device, a computer-readable storage medium and a computer device, which do not require manual participation control and are high in parking efficiency.

According to an embodiment of the present disclosure, an electrical parking control method is provided, and the method includes: when it is detected that a vehicle is in a self-piloting mode and a preset parking control condition is satisfied, a parking switching request message is generated, and sent to a Vehicle Control Unit (VCU); a parking switching message fed back by the VCU is received, the parking switching message being a message generated when the VCU detects that a vehicle state is executable parking switching; a parking switching signal corresponding to the parking switching message is generated; and the parking switching signal is pushed to an external EPB system, the parking switching signal being used to switch a state of the external EPB system, the state including a tightening state and a releasing state.

According, to another embodiment of the present disclosure, an electrical parking control method is also provided, and the method includes: when a Self-piloting Control Unit (SCU) detects that a vehicle is in a self-piloting mode and a preset parking control condition is satisfied, the SCU is controlled to generate a parking switching request message and send the parking switching request message to a VCU; the VCU is controlled to detect a vehicle state when receiving the parking switching request message; when the VCU detects that the vehicle state is executable parking switching, the VCU is controlled to generate a parking switching message and send the parking switching message to the SCU; when receiving the parking switching message, the SCU is controlled to generate a parking switching signal corresponding to the parking switching message; and the SCU is controlled to push the parking switching signal to an external EPB system, the parking switching signal being used to switch a state of the external EPB system, the state including a tightening state and a releasing state.

According to an embodiment of the present disclosure, an electrical parking control device is also provided, and the device includes: a request message sending module, configured to generate, when detecting that a vehicle is in a self-piloting mode and a preset parking control condition is satisfied, a parking switching request message, and send the parking switching request message to a VCU; a switching message receiving module, configured to receive a parking switching message fed back by the VCU, the parking switching message being a message generated when the VCU detects that a vehicle state is executable parking switching; a switching signal generation module, configured to generate a parking switching signal corresponding to the parking switching message; and a switching signal sending module, configured to push the parking switching signal to an external EPB system, the, parking switching signal being used to switch a state of the external EPB system, the state including a tightening state and a releasing state.

According to an embodiment of the present disclosure, an electrical parking control device is also provided, and the device includes an SCU and a VCU connected to each other.

The SCU is controlled to, when detecting that a vehicle is in a self-piloting mode and a preset parking control condition is satisfied, generate a parking switching request message and send the parking switching request message to the VCU; the SCU is further configured to generate, when receiving the parking switching message, a parking switching signal corresponding to the parking switching, message; and the SCU is further configured to push the parking switching signal to an external EPB system, the parking switching signal being used to switch a state of the external EPB system, the state including a tightening state and a releasing state.

The VCU is configured to detect, when receiving the parking switching request message, a vehicle state, and, when detecting that the vehicle state is executable parking switching, the VCU is further controlled to generate a parking switching message and send the parking switching message to the SCU.

According to an embodiment of the present disclosure, a computer-readable storage medium is provided, which has a computer program stored thereon, wherein when the computer program is executed by a processor, the processor is enabled to perform the steps of the method as mentioned above.

According to an embodiment of the present disclosure, a computer device is provided, which includes a memory and a processor. The memory storing a computer program, wherein when the computer program is executed by the processor, and the processor is enabled to perform the steps of the method as mentioned above.

By virtue of the above electrical parking control method and device, the computer-readable storage medium and the computer device, when it is detected that the, vehicle is in a self-piloting mode and a preset parking control condition is satisfied, a parking switching request message is sent to a VCU, and a parking switching message fed back by the VCU is received, and finally, a corresponding parking switching signal is generated and pushed according to the parking, switching message, where the parking switching signal is used to switch a state of an external EPB system, thereby realizing parking control over the external EPB system. According to the solution provided in the present disclosure, when a vehicle is in a self-piloting mode, a parking switching request message is sent to a VCU, a parking switching message fed back by the VCU when detecting that a vehicle state is executable parking switching is received, and a corresponding parking switching signal is generated and pushed according to the parking switching message, so as to control state switching of an EPB system. The EPB system can be controlled without the need for a driver to perform manual operations, and the parking efficiency is high.

DETAILED DESCRIPTION OF THE EMBODIMENTS

In order to make the purposes, technical solutions and advantages of the present disclosure clearer, the present disclosure will be further described in detail below with reference to the accompanying drawings and embodiments. It is to be understood that the specific embodiments described herein are merely illustrative of the present disclosure and are not intended to limit the scope of protection of the present disclosure.

At present, the current status of EPB control is that a driver performs a pressing operation and an EPB system controls a pull-lock execution mechanism for parking. During the driving of a vehicle, if the EPB system is tightened by manual button control, it is easy to cause a wheel to lock and even the vehicle to run out of control. In this way, in the case of high speed or high torque, the tailing, side slipping or collision of the vehicle may be caused by improper control of the EPB system, which has a great influence on the drivability and safety. In addition, for a pilotless automobile with higher safety requirements, in addition to the above, how to realize a fully automatic, parking function puts more stringent requirements on the control of EPB.

Figure 1:
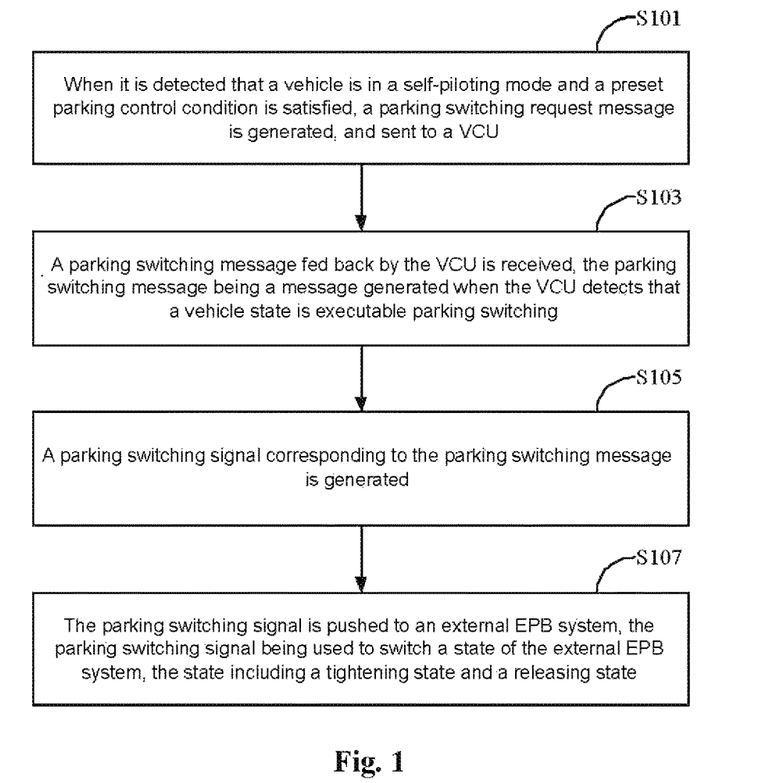
FIG. 1 is a flowchart of an electrical parking control method according to an embodiment of the present disclosure.

FIG. 1 is a flowchart of an electrical parking control method according to an embodiment of the present disclosure. As shown in FIG. 1, in the present embodiment, the electrical parking control method includes the steps as follows.

At step S101, when it is detected that a vehicle is in a self-piloting mode and a preset parking control condition is satisfied, a parking switching request message is generated, and sent to a VCU.

With the development of smart automobile technology, vehicles may support a manual piloting mode, and may also achieve a self-piloting mode. The manual piloting mode is similar to the current ordinary self-piloting mode, that is, a driving operation is directly performed by a driver; and in the self-piloting mode, self-piloting can be realized by an on-board computer system. A vehicle self-piloting technology relies on artificial intelligence, visual computing, radar, surveillance devices and global positioning systems to work together to allow on-board computers to operate motor vehicles automatically and safely without any human active operation. Specifically, the current piloting mode of a vehicle is monitored, and when it is detected that the vehicle is in a self-piloting mode, it is further judged whether a preset parking control condition is satisfied. The parking control condition may be whether the vehicle needs to release parking or tighten parking, that is, whether a parking releasing condition is satisfied or whether a parking tightening condition is satisfied. Further, when the vehicle is in the self-piloting mode and the vehicle is automatically started to drive from a parking state, a current state of the vehicle can be acquired by an SCU, and according to the acquired current state of the vehicle, it is determined that it is necessary to release parking, that is, parking control is required; after the vehicle arrives at the destination, it is necessary to tighten parking, that is, parking control is also required. In a specific disclosure, the order of detecting the piloting mode of the vehicle and the judgment of the parking control condition is not limited, and the parking control condition may be judged while the piloting mode of the vehicle is detected; or after it is determined that the preset parking control condition is satisfied, it is further detected whether the vehicle is in a self-piloting mode. When the vehicle is in the self-piloting mode and the preset parking control condition is satisfied, a parking switching request message is generated, and sent to a VCU. The VCU is one of the core components of a smart automobile, which is an assembly control unit of a vehicle power system and is responsible for coordinating the work of an engine, a drive motor, a gearbox, a power battery and other components. The VCU can reasonably interpret the driver's operation, receive feedback information from various subsystems of the vehicle, provide decision feedback for the driver, and send control commands to the various subsystems of the vehicle to achieve normal vehicle driving. Specifically, the VCU may determine the driving intention of the driver by collecting signals such as an accelerator pedal, a gear position, and a brake pedal; by monitoring vehicle state (vehicle speed, temperature, etc.) information, the VCU sends an operating state control command of the vehicle to a power system and a power battery system after judgment to control the working mode of an on-board accessory power system; and the VCU also has a vehicle system fault diagnosis protection and storage function. The parking switching request message is used to request the VCU to perform vehicle state detection to determine if the parking control is appropriate. In a specific implementation, the generated parking switching request message may be sent by the SCU to the VCU through a Controller Area Network (CAN) bus connected between the VCU and the SCU. The VCU performs vehicle state detection and provides feedback according to the detection result.

At step S103, a parking switching message fed back by the VCU is received, the parking switching message being a message generated when the VCU detects that a vehicle state is executable parking switching.

After the parking switching request message is sent to the VCU, a parking switching message fed back by the VCU is received, the parking switching message being a message generated when the VCU detects that a vehicle state is executable parking switching. Specifically, the parking switching request message is used to request the VCU to perform vehicle state detection to determine whether the parking control is appropriate, and when detection result of the vehicle state is executable switching, a parking switching message is generated, and fed back to the SCU. For example, when the vehicle is self-piloted to arrive at the destination, it is necessary to tighten parking at this time, that is, the parking control is required, and after the parking switching request message is sent to the VCU, a parking switching message fed back is received.

At step S105, a parking switching signal corresponding to the parking switching message is generated.

After the parking switching message fed back by the VCU is received, a corresponding parking switching signal is generated according to the parking switching message. Specifically, the parking switching signal may include a first switching signal and a second switching signal, where the first switching signal may be a switching signal for controlling switching from the tightening state to the releasing state, the second switching signal may be a switching signal for controlling switching from the releasing state to the tightening state, and first and second are merely descriptions herein, and are not limited thereto. For example, when the vehicle is self-piloted to arrive at the destination, and a parking switching request message is sent to the VCU, after the parking switching message fed back by the VCU is received, a corresponding parking switching signal is generated, where the parking switching signal may include a second switching signal for controlling state switching of an external EPB system to bring it into the tightening state, thereby realizing parking.

At step S107, the parking switching signal is pushed to an external EPB system, the parking switching signal being used to switch a state of the external EPB system, the state including a tightening state and a releasing state.

After a parking switching signal is generated, the parking switching signal is pushed to an external EPB system, the parking switching signal being used to switch a state of the external EPB system, the state including a tightening state and a releasing state. The EPB system is an electrical parking brake, which is a system for integrating the temporary braking function during driving and the long-term braking function after parking, and realizing a parking brake technology by electrical control. The working principle is the same as that of a mechanical parking brake, which controls the parking brake by the friction between a brake disc and a brake pad. The working state of the EPB system includes a tightening state and a releasing state, wherein the tightening state realizes parking, and the releasing state realizes parking release. After the parking switching signal is obtained, it may be pushed to the EPB system by a hard wire, so that the state of the vehicle is switched, and the parking control of the vehicle is realized.

According to the above electrical parking, control method, when it is detected that a vehicle is in a self-piloting mode and a preset parking control condition is satisfied, a parking switching request message is sent to a VCU, a parking switching message fed back by the VCU is received, and finally, a corresponding parking switching signal is generated and pushed according to the parking switching message, where the parking switching signal is used to switch a state of an external EPB system, thereby realizing parking control over the external EPB system. According to the solution of the present disclosure, when a vehicle is in a self-piloting mode, a parking switching request message is sent to a VCU, a parking switching message fed back by the VCU when detecting that a vehicle state is executable parking switching is received, and a corresponding parking switching signal is generated and pushed according to the parking switching message, so as to control state switching of an EPB system. The EPB system can be controlled without the need for a driver to perform manual operations, and the parking efficiency is high.

In an embodiment, the step of generating, when detecting that a vehicle is in a self-piloting mode and a preset parking control condition is satisfied, a parking switching request message and sending the parking switching request message to a VCU may be carried out in the following forms:

detecting an operation state of a vehicle, and determining a piloting mode of the vehicle according to the operation state;

judging, when the vehicle is in a self-piloting mode, whether parking switching control is required according to a running state of the vehicle; and generating, when the judgment result is that parking switching control is required, a parking switching request message, and sending the parking switching request message to a VCU.

Specifically, an operation state of a vehicle is detected, and a piloting mode of the vehicle is determined according to the operation state. For example, it is detected whether the vehicle starts a system self-operating function, when the vehicle starts the system self-operating function, it may be determined that the piloting mode of the vehicle is a self-piloting mode, and otherwise, the piloting mode is a manual piloting mode. It is also possible to detect a sending object of each control command of the vehicle to determine the piloting mode of the vehicle. For example, if the sending object of each control command of the vehicle is detected by an on-board computer system, it may be determined that the vehicle is in the self-piloting mode; if it is detected that each control command is sent by an external control terminal, it may be determined that the vehicle is in the manual piloting mode.

When the vehicle is in the self-piloting mode, it is judged whether parking switching control is required according to a running state of the vehicle. If the vehicle is in the self-piloting mode, it is necessary to judge when to perform parking switching control according to the running state of the vehicle, such as arrival at the destination, starting of parking brake, ending of the self-piloting mode, or starting of the self-piloting mode, and starting of an engine. The running state of the vehicle may include a starting state, a driving state, and a brake state, where the starting state is starting the engine to start running, the driving state is the running process, and the brake state is a braking operation at the end of running. It may be judged whether parking switching control is required according to the running state of the vehicle.

In an embodiment, the step of determining, when the vehicle is in a self-piloting mode, whether parking switching control is required according to the running state of the vehicle may be implemented by the following manner;

when the vehicle is in a self-piloting mode, a running state of the vehicle is required; and when the running state of the vehicle is a brake state or a starting state, then the judgment result is set as that the parking switching control is required for the vehicle.

Specifically, when the vehicle is in the self-piloting mode, a running state of the vehicle is acquired. The running state of the vehicle may include a starting state, a driving state, and a brake state. When the obtained running state of the vehicle is a brake state or a starting state, the judgment result is set as that parking switching control is required for the vehicle. Generally, when the vehicle is in a normal driving state, that is, during normal driving, it is unnecessary to perform parking control on the EPB system, and only when the vehicle starts or brakes, the EPB needs to release the parking-assisted start or assisted brake to tighten the parking, so as to ensure the safe and smooth driving of the vehicle. Therefore, when it is determined that the running state of the vehicle is a brake state or a starting state, it may be determined that parking switching control is required for the vehicle, and the judgment result is set accordingly.

When it is determined that parking switching control is required according to the running state of the vehicle, a parking switching request message is generated, and sent to the VCU. Specifically, a judgment result is acquired, and when the judgment result is that parking switching control is required, a parking switching request message is generated and issued. In a specific implementation, when the running state of the vehicle is in a starting state or a brake state, it may be determined that parking switching control is required. At this time, a parking switching request message is generated, and sent to the VCU, so that the VCU performs vehicle state detection.

In an embodiment, the step of pushing the parking switching signal to an external EPB system may be carried out by the following manner: when the parking switching signal is pushed to an external EPB system, a timer is started. Continue to push the parking switching signal, and when the timing value of the timer reaches a preset delayed time value, stop pushing the parking switching signal.

Specifically, the parking switching signal is used to switch a state of the external EPB system. When the parking switching signal is pushed to the external EPB system, a timer is started for timing, and the parking switching signal continues to be pushed, and when a timing value reaches a preset delayed time value, pushing is stopped. The delayed time may be set according to the mechanical characteristics of an EPB actuator. In general, the EPB system includes an electrical parking controller and an electrical parking actuator. The electrical parking controller receives a control signal and controls the electrical parking actuator to perform a tightening or releasing action to switch the EPB system to a tightening state or a releasing state. Due to the mechanical characteristics of the electrical parking actuator, the EPB system will generate a certain delay when performing the corresponding tightening or releasing action. By performing a certain delay judgment on the pushed parking switching signal, the normal operation of the EPB system can be further ensured.

In an embodiment, after the step of pushing the parking switching signal to the external EPB system, it may also be detected whether the EPB system completes state switching, and if not, a fault is reported to timely prompt a parking control result, so as to ensure that, the electrical parking control can be completed truly and normally.

In an embodiment, the electrical parking control method of the present disclosure may further include the following steps: when an active switching message sent by the VCU is received, a corresponding active switching signal is generated according to the active switching message; and the active switching signal is pushed to the external EPB system, the active switching message being a message generated when the VCU monitors that the vehicle is in a brake state and a vehicle state is executable parking switching.

Specifically, in the self-piloting mode, if the active switching message sent by the VCU is received, a corresponding active switching signal is generated according to the active switching message and pushed to the EPB system to make the EPB system perform state switching. The active switching message is a message generated when the VCU monitors that the vehicle is in a brake state and a vehicle state is executable parking switching. In a specific disclosure, when the vehicle is in the self-piloting mode, the VCU also monitors the running state of the vehicle, the vehicle speed, etc. When the vehicle is in a brake state, that is, a brake actuation mechanism is performing a brake operation, for example, when a brake pedal is in a stepped state and the vehicle speed is lower than a first speed and continues for a first time threshold, the VCU actively performs vehicle state detection. When a state detection result is executable parking switching, an active switching message is generated and sent to an SCU. The first speed may be set according to a minimum vehicle speed detected by a vehicle speed sensor, for example, it may be preset to 1.5 km/h. The first time threshold may be calibrated according to a time period during which the driver is generally preferred to brake from the time when the vehicle stops to pulling of a parking brake. For example, it may be preset to 6 seconds. In addition to the SCU for the parking control request, on the other hand, the electrical parking control can be performed by the VCU. Thus, when the SCU fails to request the parking control in time due to device fault or other reasons, the VCU with higher performance and greater security actively sends an active switching message to realize the parking control of the EPB system, which can further ensure the safe parking in the self-piloting mode of the vehicle.

In an embodiment, the electrical parking control method of the present disclosure may further include the following steps: when a preset emergency brake condition is satisfied, then an emergency brake request is sent to the VCU, the emergency brake request being used to request the VCU to directly switch the state of the EPB system.

Specifically, an emergency situation is monitored in real time. When a preset emergency brake condition is satisfied, such as sudden deceleration of a vehicle in front, sudden occurrence of a road, sudden over-speed of a vehicle behind, or forced cut-in, an emergency brake request is generated and sent to the VCU to request the VCU to directly switch the state of the EPB system. In a specific disclosure, the emergency brake condition may be configured according to the situation in the vehicle driving process that requires emergency braking, which may include, but is not limited to, a vehicle fault. The fault may affect the life safety of a passenger. The road is in an occurrence, such as overtaking cut-in, emergency brake of a front vehicle, and congestion of a front road. When emergency brake is required, an emergency brake request is sent to the VCU to request the VCU to directly participate in switching the state of the EPB system, so that the assisted emergency brake parking control can be realized in an emergency situation.

In an embodiment, the electrical parking control method of the present disclosure may further include the following steps: when an external control message is received, a duration of the external control message is recorded, and when the duration of the external control message exceeds a preset misoperation time threshold, the process proceeds to the step of generating a parking switching, request message.

Specifically, when an external control message sent by an external control terminal is received, a duration of the external control message is recorded, and when the duration exceeds a preset misoperation time threshold, the process proceeds to the step of generating a parking switching request message. The external control message is sent by the external control terminal, and the external control terminal may include, but is not limited to, an electrical parking switch and a remote control switch. The remote control switch may communicate with the SCU through radio signals, so that the EPB can be controlled to meet a remote control function of self-piloting. The misoperation time threshold may be configured according to a misoperation delayed time. For example, it may be preset to 2 seconds. In the self-piloting mode, if the duration of receiving the external control message exceeds 2 seconds, the operation is considered to be not the misoperation of the external control terminal, and the process proceeds to the step of generating a parking switch request message; otherwise, it is considered that the operation is the misoperation of the external control terminal, and the misoperation is ignored, thereby preventing the driver from touching the electrical parking switch to lock a vehicle up and even make the vehicle out of control due to the misoperation. In general, when the vehicle is in the self-piloting mode, the driving control of the vehicle including the electrical parking control is independently controlled by the system. If a passenger mistakenly operates the electrical parking switch or the remote control switch, the misoperation is judged, and if it is determined to be a misoperation, this operation is ignored; otherwise, the control of the external control terminal is executed.

In an embodiment, the electrical parking control method of the present disclosure may further include the following steps: when it is detected that the vehicle is in a manual piloting mode and an external control message is received, a corresponding external switching signal is generated according to the external control message, and the external switching signal is pushed to the external EPB system, the external switching signal being used to switch the state of the external EPB system.

The current smart automobile still supports the manual piloting mode, that is, the driver drives the vehicle. When it is detected that the vehicle is in the manual piloting mode, an external control message is further monitored; when the external control message is received, a corresponding external switching signal is generated and pushed to the EPB system, so as to make the EPB system switch the state thereof. The electrical parking control method of the present disclosure is still compatible with the manual operation EPB mode, and electrical parking control can be performed in the manual piloting mode.

Based on the above electrical parking control method, the present disclosure also provides an electrical parking control device.

Figure 2:
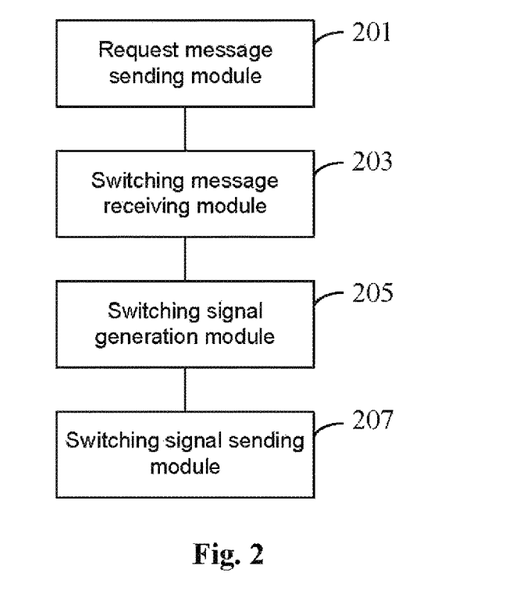
FIG. 2 is a structural block diagram of an electrical parking control device according to an embodiment of the present disclosure.

FIG. 2 is a structural block diagram of an electrical parking control device according to an embodiment of the present disclosure. As shown in FIG. 2, in the present embodiment, the electrical parking control device includes a request message sending module 201, a switching message receiving module 203, a switching signal generation module 205, and a switching signal sending module 207.

The request message sending module 201 is configured to generate, when detecting that a vehicle is in a self-piloting mode and a preset parking control condition is satisfied, a parking switching request message, and send the parking switching request message to a VCU.

The switching message receiving module 203 is configured to receive a parking switching message fed back by the VCU, the parking switching message being a message generated when the VCU detects that a vehicle state is executable parking switching.

The switching signal generation module 205 is configured to generate a parking switching signal corresponding to the parking switching message.

The switching signal sending module 207 is configured to push the parking switching signal to an external EPB system, the parking switching signal being used to switch a state of the external EPB system, the state including a tightening state and a releasing state.

According to the above electrical parking control device, when detecting that a vehicle is in a self-piloting mode and a preset parking control condition is satisfied, a request message sending module sends a parking switching request message to a VCU, a switching message receiving module receives a parking switching message fed back by the VCU, a switching signal generation module generates a corresponding parking switching signal according to the parking switching message, and finally, a switching signal sending module pushes the parking switching signal to an external EPB system, so as to switch a state of the external EPB system, thereby realizing parking control over the external EPB system. By means of the above electrical parking control device, when a vehicle is in a self-piloting mode, an EPB system can be controlled without the need for a driver to perform manual operation, so that the parking efficiency is high.

In addition, the present disclosure also provides an electrical parking control method.

Figure 3:
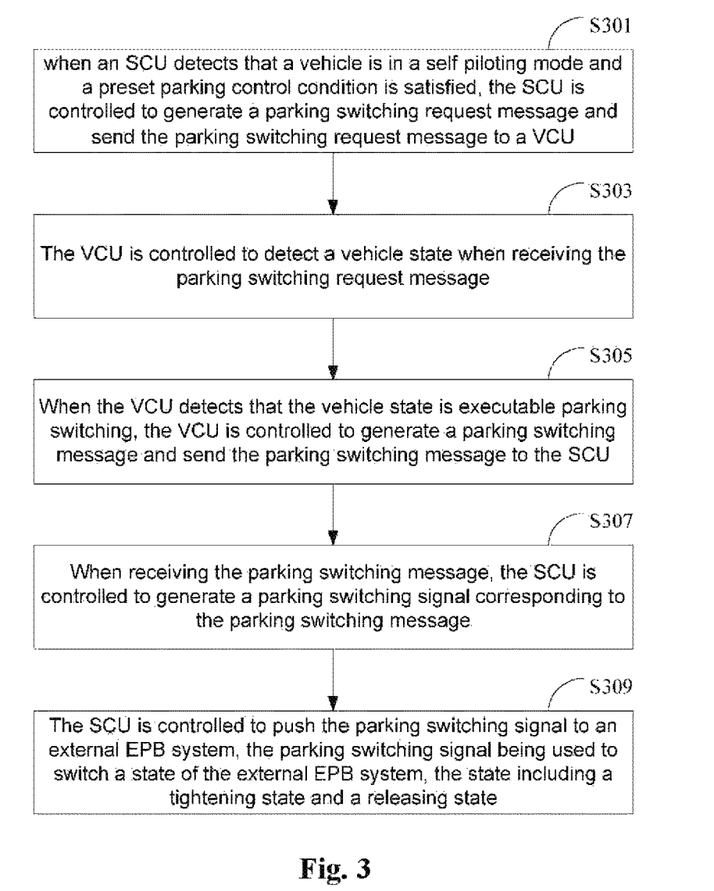
FIG. 3 is a flowchart of an electrical parking control method according to an embodiment of the present disclosure.

FIG. 3 is a flowchart of an electrical parking control method according to an embodiment of the present disclosure. As shown in FIG. 3, in the present embodiment, the electrical parking control method includes the steps as follows.

At step S301, when an SCU detects that a vehicle is in a self-piloting mode and a preset parking control condition is satisfied, the SCU is controlled to generate a parking switching request message and send the parking switching request message to a VCU.

In the present embodiment, an SCU detects a driving mode of a vehicle, when the vehicle is in a self-piloting mode and it is monitored that a preset parking control condition is satisfied, for example, the vehicle needs to brake or start, the SCU is controlled to generate a parking switching request message and send the parking switching request message to a VCU.

At step S303, the VCU is controlled to detect a vehicle state when receiving the, parking switching request message.

The VCU is controlled to detect a vehicle state when receiving the parking switching request message. The detection of a vehicle state may include, but is not limited to, the detection of a vehicle state such as a current brake pedal state, a vacuum pump state, an emergency brake command state, a vehicle torque state, and various transmission component fault states. In a specific implementation, it is possible to detect only the vehicle state associated with the electrical parking, such as a vehicle speed, a brake controller state, a vacuum pump state, and an EPB transmission component fault state, so as to ensure that the electrical parking can be safely performed.

At step S305, when the VCU detects that the vehicle state is executable parking switching, the VCU is controlled to generate a parking switching message and send the parking switching message to the SCU.

The VCU detects a vehicle state, and when the detected vehicle state is executable parking switching, the VCU is further controlled to generate a parking switching message and send the parking switching message to the SCU. Ina specific disclosure, for example, the VCU only detects the vehicle state associated with the electrical parking, when each state is normal, that is, the vehicle state is executable parking switching, a parking switching message is further generated and sent to the SCU.

At step S307, when receiving the parking switching message, the SCU is controlled to generate a parking switching signal corresponding to the parking switching message.

When the SCU receives a parking switching message, the SCU is controlled to generate a parking switching signal corresponding to the parking switching message, the parking switching signal being used to switch a state of the external EPB system, the state including a tightening state and a releasing state.

At step S309, the SCU is controlled to push the parking switching signal to an external EPB system, the parking switching signal being used to switch a state of the external EPB system, the state including a tightening state and a releasing state.

After the SCU generates a parking switching signal corresponding to the parking switching message, the SCU is further controlled to push the parking switching signal to the external EPB system, so as to switch the state of the EPB system, thereby realizing parking control of the EPB system.

For example, in the self-piloting mode, when the vehicle is parked, that is, when the vehicle is stopped, if the SCU detects that the preset parking control condition is satisfied, that is, when the vehicle needs to be started, the SCU sends a parking switching request message to the VCU, where the parking switching request message may include a vehicle driving torque value; when the VCU determines that the vehicle driving torque value is greater than a preset driving torque value, the VCU performs vehicle state detection; when the detection result is executable parking switching, a parking switching message is sent to the SCU, after receiving the parking switching message, the SCU pushes a parking switching signal to the EPB system through a hard wire, so as to switch the state of the EPB system. At this time, the EPB is released to enter the releasing state, and the vehicle is automatically started. The preset driving torque value may be calibrated according to the characteristics of an engine or a drive motor. The preset value may be ±50 Nm.

According to the above electrical parking control method, when an SCU detects that a vehicle is in a self-piloting mode and a preset parking control condition is satisfied, the SCU is further controlled to send a parking switching request message to a VCU; when the VCU receives the parking switching request message, the VCU is controlled to detect a vehicle state; when the vehicle state detected by the VCU is executable parking switching, the VCU is controlled to generate a parking switching message and feeds it back to the SCU; the SCU receives the parking switching message and is controlled to generate a corresponding parking switching signal; and finally, the SCU is controlled to push the parking switching signal to an external EPB system, so as to switch a state of the external EPB system, thereby realizing parking control over the external EPB system. By means of the above electrical parking control method, when a vehicle is in a self-piloting mode, a VCU and an SCU are combined to jointly perform parking control on an EPB system, and the EPB system can be controlled without the need for a driver to perform manual operation, so that the parking efficiency is high.

In an embodiment, after the step of controlling the SCU to push the parking switching signal to the external EPB system, it may also be detected whether the EPB system completes state switching by the SCU, and if not, a fault is reported, so as to ensure that the electrical parking control can be completed truly and normally.

In an embodiment, the electrical parking control method of the present disclosure may further include the following steps:

when the VCU detects that the vehicle, is in a brake state and the vehicle state is executable parking switching, the VCU is controlled to send an active switching message to the SCU;

when receiving, the active switching message, the SCU is controlled to generate a corresponding active switching signal; and the SCU is controlled to push the active switching signal to the external EPB system, and the parking switching signal being used to switch the state of the external EPB system.

Specifically, when the vehicle is in the self-piloting mode, the VCU also monitors the running state of the vehicle, the vehicle speed, etc. When the vehicle is in a brake state, that is, a brake actuation mechanism is performing a brake operation, for example, when a brake pedal is in a stepped state and the vehicle speed is lower than a first speed and continues for a first time threshold, the VCU is further controlled to perform vehicle state detection. When a state detection result is executable parking switching, the VCU is controlled to generate an active switching message and send the active switching message to the SCU. The first speed may be set according to a minimum vehicle speed detected by a vehicle speed sensor, for example, it may be preset to 1.5 km/h. The first time threshold may be calibrated according to a time period during which the driver is generally preferred to brake from the time when the vehicle stops to pulling of a parking brake. For example, it may be preset to 6 seconds. In a specific implementation, if the first speed is set to 1.5 km/h, and the first time threshold is set to 6 seconds, the VCU detects that the vehicle is in a brake state; if the vehicle speed is lower than 1.5 km/h and the threshold exceeds 6 seconds, the VCU is controlled to generate an active switching message and send it to the SCU. After the SCU receives the active switching message, the SCU is controlled to generate a corresponding active switching signal, and finally, the SCU is controlled to push the active switching signal to the external EPB system, the parking switching signal being used to switch the state of the external EPB system. The electrical parking control is performed by the VCU. Thus, when the SCU fails to request the parking control in time due to device fault or other reasons, the VCU with higher performance and greater security actively sends an active switching message to realize the parking control of the EPB system, which can further ensure the safe parking in the self-piloting mode of the vehicle.

In an embodiment, the electrical parking control method of the present disclosure may further include the steps as follows:

when the SCU detects that a preset emergency brake condition is satisfied, the SCU is controlled to generate an emergency brake request and send the emergency brake request to the VCU;

The VCU records a duration of the emergency brake request;

when the duration of the emergency brake request is greater than a preset emergency brake time threshold, the VCU is controlled to detect a vehicle state;

when the VCU detects that the vehicle state is executable parking switching, the VCU is controlled to send an emergency brake message to a brake controller, so that the brake controller enters a brake working state; and when the VCU detects that a current speed of the vehicle is smaller than a preset emergency parking speed, the VCU is controlled to send a tightening control signal to the EPB system, the tightening control signal being used to control the EPB system to enter a tightening state.

Specifically, in the self-piloting mode, when the SCU detects that a preset emergency brake condition is satisfied, for example, the vehicle has a fault which may affect the life safety of a passenger. When the road is in an occurrence, such as overtaking cut-in, emergency brake of a front vehicle, and congestion of a front road, the SCU is controlled to generate an emergency brake request and send the emergency brake request to the VCU. The VCU records a duration of the emergency brake request, and when the duration of the emergency brake request recorded by the VCU is greater than a preset emergency brake time threshold, the VCU is controlled to detect a vehicle state. The emergency brake time threshold may be set according to an emergency brake demand and a brake pedal travel depth. When the VCU detects that the vehicle state is executable parking switching, the VCU is controlled to send an emergency brake message to a brake controller, so that the brake controller enters a brake working state. Further, the VCU may send the emergency brake message to a brake controller through the CAN bus according to the vehicle speed and the vehicle deceleration to proportionally output a braking force to the entire vehicle. After the brake controller enters the brake working state, the brake controller controls a brake actuation mechanism. For example, the brake pedal performs an emergency brake action. When the VCU detects that, a current speed of the vehicle is smaller than a preset emergency parking speed, the VCU is controlled to send a tightening control signal to the EPB system, the tightening control signal being used to control the EPB system to enter a tightening state. The emergency parking speed may be set according to the vehicle speed and deceleration. The preset range may be 0-5 km/h. Further, when the VCU detects that a vehicle speed is lower than an emergency parking speed, the VCU is controlled to send a tightening control signal to the EPB system through a CAN bus, so as to realize parking control during emergency braking.

Based on the above electrical parking control method, the present disclosure also provides an electrical parking control device.

Figure 4:
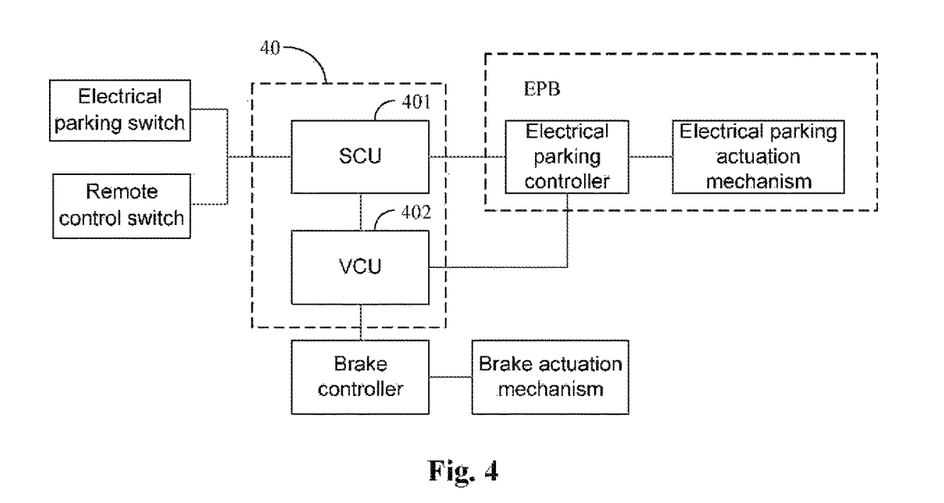
FIG. 4 is a structural block diagram of an electrical parking control device according to an embodiment of the present disclosure.

FIG. 4 is a structural block diagram of an electrical parking control device according to an embodiment of the present disclosure. As shown in FIG. 4, in the present embodiment, the electrical parking control device 40 includes an SCU 401 and a VCU 402 connected to each other.

the SCU 401 is controlled to, when detecting that a vehicle is in a self-piloting mode and a preset parking control condition is satisfied, generate a parking switching request message and send the parking switching request message to the VCU 402; the SCU 401 is further configured to generate, when receiving the parking switching message, a parking switching signal corresponding to the parking switching message; and the SCU 401 is further configured to push the parking switching signal to an external EPB system, the parking switching signal being used to switch a state of the external EPB system, the state including a tightening state and a releasing state.

The VCU 402 is configured to detect, when receiving the parking switching request message, a vehicle state, and, when detecting that the vehicle state is executable parking switching, the VCU 402 is further controlled to generate a parking switching message and send the parking switching message to the SCU 401.

According to the above electrical parking control device, when an SCU detects that a vehicle is in a self-piloting mode and a preset parking control condition is satisfied, the SCU is further controlled to send a parking switching request message to a VCU; when the VCU receives the parking switching request message, the VCU is controlled to detect a vehicle state; when the vehicle state detected by the VCU is executable parking switching, the VCU is controlled to generate a parking switching message and feeds it back to the SCU; the SCU receives the parking switching message and is controlled to generate a corresponding parking switching signal; and finally, the SCU is controlled to push the parking switching signal to an external EPB system, so as to switch a state of the external EPB system, thereby realizing parking control over the external EPB system. By means of the above electrical parking control method, when a vehicle is in a self-piloting mode, a VCU and an SCU are combined to jointly perform parking control on an EPB system, and the EPB system can be controlled without the need for a driver to perform manual operation, so that the parking efficiency is high.

Further, FIG. 4 shows an application scenario of the electrical parking control device 40. The SCU 401 is connected to the VCU 402 and the EPB system respectively, the SCU 401 is also connected to the electrical parking switch and the remote control switch, the VCU 402 is also connected to the brake controller, and the brake controller is also connected to the brake actuation mechanism. The EPB system includes an electrical parking controller and an electrical parking actuation mechanism, wherein the electrical parking controller is connected to the SCU 401, the VCU 402 and the electrical parking actuation mechanism respectively. Furthermore, the VCU 402 is respectively connected to the SCU 401, the electrical parking controller and the brake controller via a CAN bus, the SCU 401 is connected to the electrical parking switch and the electrical parking controller via a hard wire, the remote control switch is connected to a wireless transceiver built in the SCU 401 by a radio signal, the brake controller is connected to the brake actuation mechanism via a hard wire, and the electrical parking controller is also connected to the electrical parking actuation mechanism via a hard wire.

Figure 5:
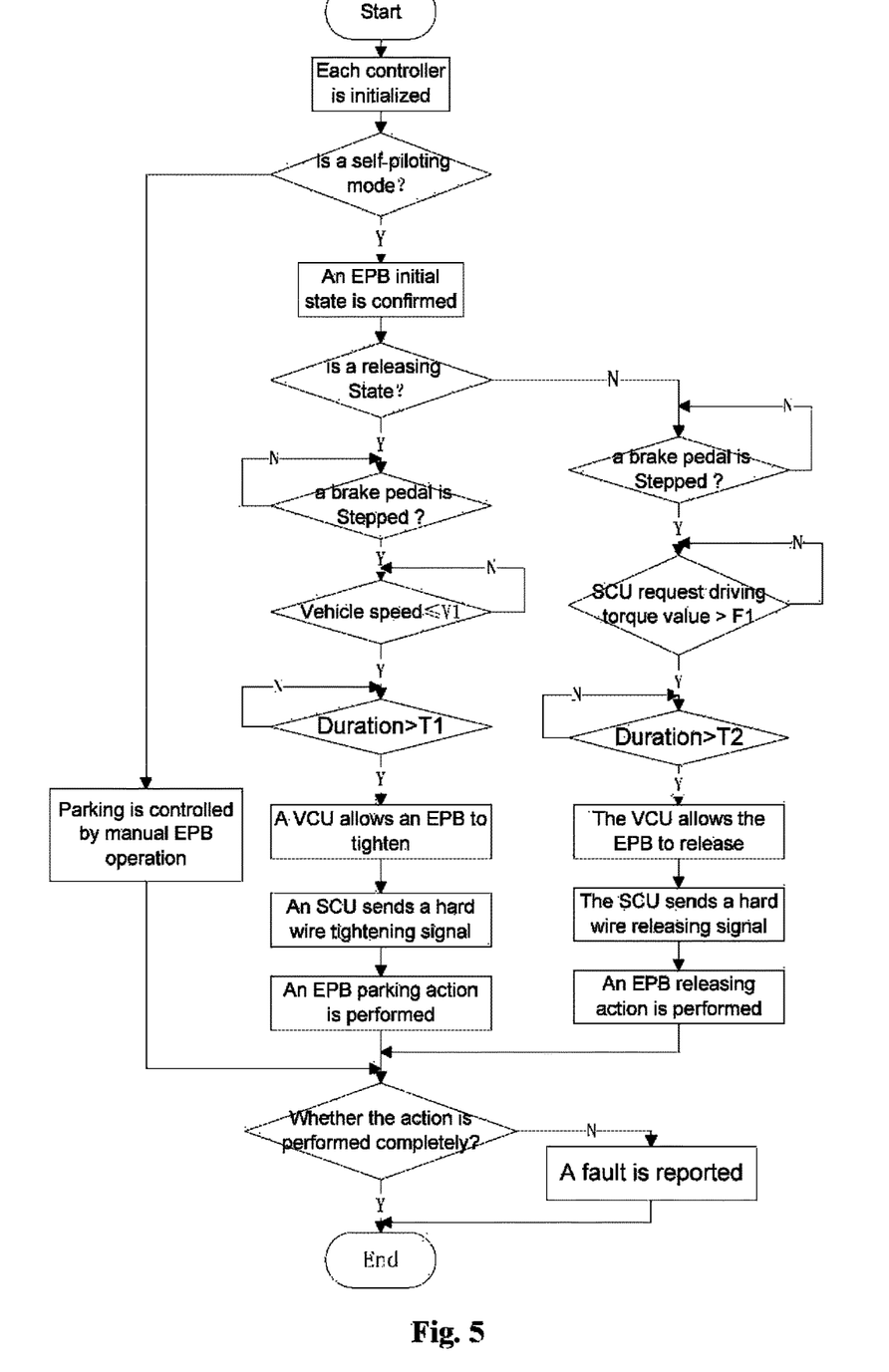
FIG. 5 is a flowchart of electrical parking control through an electrical parking control method in an embodiment of the present disclosure.

FIG. 5 is a flowchart of electrical parking control through an electrical parking control method in an embodiment of the present disclosure. As shown in FIG. 5, each controller is first initialized and may include, but is not limited to, a VCU, a SCU, an electrical parking controller in an EPB system, and a brake controller. It is monitored whether a vehicle is in a self-piloting mode, and if not, a driver realizes parking control by manually operating the EPB system. If the vehicle is in the self-piloting mode, an initial state of the EPB system is further confirmed, that is, it is confirmed whether the state of the EPB system is a tightening state or a releasing state, and the state of a brake pedal is further detected. When the state of the EPB system is in the releasing state, and the brake pedal is not stepped, it is judged whether a driving torque value requested by the SCU is greater than a preset driving torque value F1 and a duration exceeds a preset driving time T2. When both are satisfied, the VCU may determine that the EPB system is allowed to release, thereby controlling the SCU to send a hard wire releasing signal to cause the EPB system to perform a release action. Conversely, if the state of the EPB system is in the releasing state, and the brake pedal is stepped, it is further detected whether a vehicle speed is lower than or equal to a preset decelerated speed value v1 and a duration exceeds a preset decelerating time T1. When both are satisfied, the VCU may determine that the EPB system is allowed to tighten, thereby controlling the SCU to send a hard wire tightening signal to cause the EPB system to perform a parking action. Finally, it is monitored whether the EPB system completes the corresponding parking action or release action. If not, a fault is reported to timely prompt a parking control result to ensure that the electrical parking control can be completed truly and normally.

Figure 6:
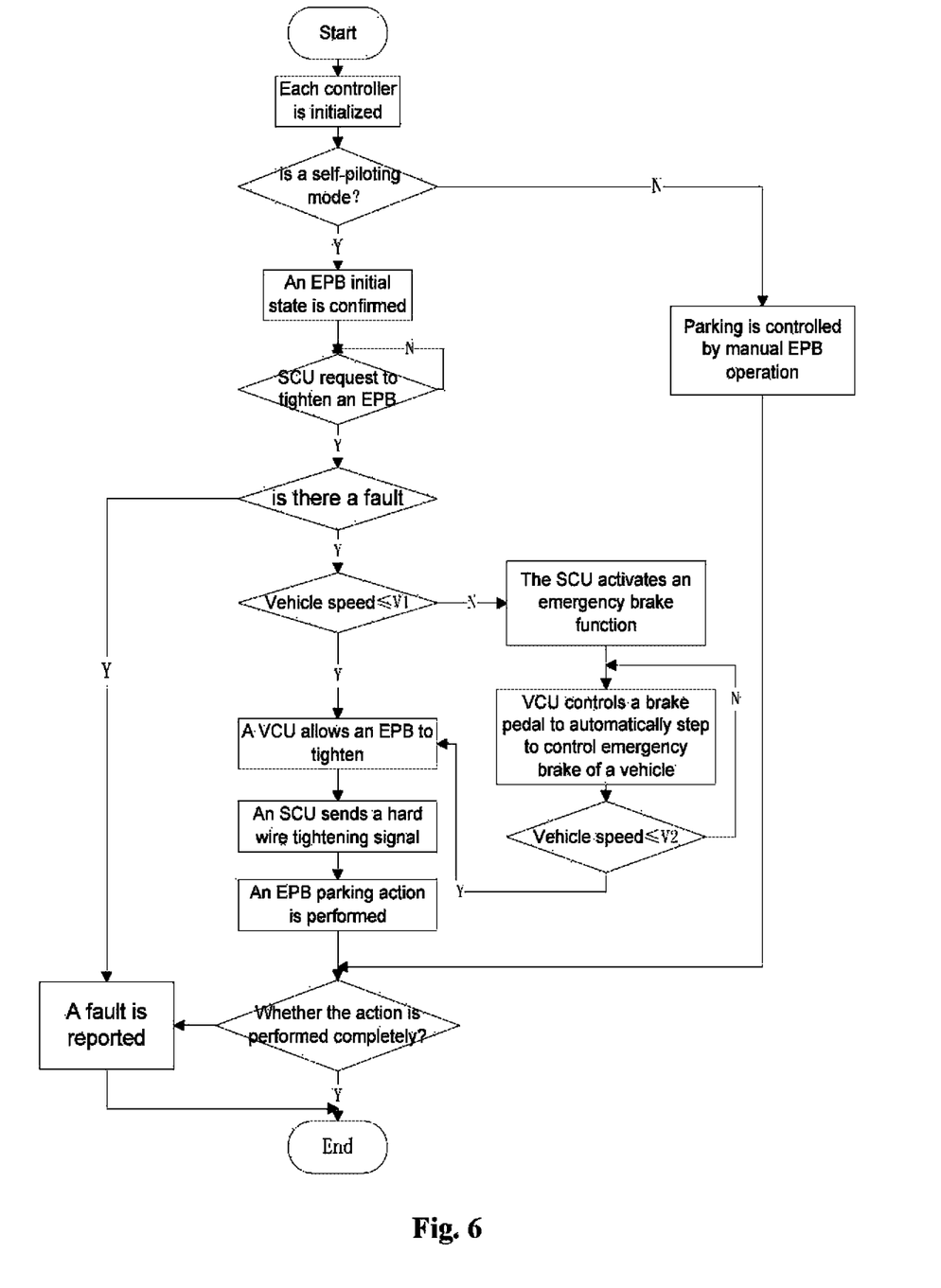
FIG. 6 is a flowchart of electrical parking control through an electrical parking control method in another embodiment of the present disclosure.

FIG. 6 is a flowchart of electrical parking control through an electrical parking control method in another embodiment of the present, disclosure. As shown in FIG. 6, compared with the embodiment shown in FIG. 5, in the present embodiment, after confirming the initial state of the EPB system, it is monitored whether the SCU requests to tighten the EPB system, and if so, it is further judged whether there is a fault. If there is no fault, it is judged whether the vehicle speed is lower than or equal to a preset decelerated speed value v1, and if so, the VCU may determine that the EPB system is allowed to tighten, thereby controlling the SCU to send the hard wire tightening signal to make the EPB system perform a parking action; if not, an emergency brake function is activated by the SCU, and the brake pedal is automatically stepped by the VCU, thereby controlling the emergency braking of the vehicle. When the VCU monitors that the vehicle speed is lower than or equal to a preset emergency parking speed v2, the process proceeds to the step of controlling the EPB system to perform tightening, thereby realizing the electrical parking control in the case of emergency braking.

Based on the electrical parking control method, the present disclosure also provides a computer-readable storage medium.

In an embodiment, the computer-readable storage medium provided by the present disclosure stores a computer program, wherein when the computer program is executed by a processor, the processor is enabled to perform the steps of the electrical parking control method as mentioned above.

Based on the electrical parking control method and device, and the computer-readable storage medium, the present disclosure also provides a computer device.

In an embodiment, the computer device provided by the present disclosure includes a memory and a processor, the memory storing a computer program, wherein when the computer program is executed by the processor, the processor is enabled to perform the steps of the electrical parking control method as mentioned above.

Those skilled in the art can understand that all or part of the processes in the above method embodiments may be implemented by a computer program to instruct related hardware, and the program may be stored in a nonvolatile computer-readable storage medium. When the program is executed, the flow of each method embodiment as described above may be included. Any reference to a memory, storage, database, or other media used in various embodiments provided by the present disclosure may include nonvolatile and/or volatile memories. The nonvolatile memory may include a Read Only Memory (ROM), a Programmable ROM (PROM), an Electrically Programmable ROM (EPROM), an Electrically Erasable Programmable ROM (EEPROM), or a flash memory. The volatile memory may include a Random Access Memory (RAM) or an external cache memory. By way of illustration and not limitation, RAM is available in a variety of formats, such as a Static RAM (SRAM), a Dynamic RAM (DRAM), a Synchronous DRAM (SDRAM), a Dual Data Rate SDRAM (DDRS-DRAM), an Enhanced SDRAM (ESDRAM), a Synchlink DRAM (SLDRAM), a Rambus Direct RAM (RDRAM), a Direct Rambus Dynamic RAM (DRDRAM), and a Rambus Dynamic RAM (RDRAM).

The technical features of the above-described embodiments may be arbitrarily combined. For the sake of brevity of description, all possible combinations of the technical features in the above embodiments are not described. However, as long as there is no contradiction between the combinations of these technical features, all should be considered as the scope of this description.

The above embodiments are merely illustrative of several implementation manners of the present disclosure with specific and detailed description, and are not to be construed as limiting the patent scope of the present invention. It is to be noted that a number of variations and modifications may be made by those of ordinary skill in the art without departing from the conception of the present disclosure, and all fall within the scope of protection of the present disclosure. Therefore, the scope of protection of the present disclosure should be determined by the appended claims.

What is claimed is:

1. An electrical parking control method, comprising:
generating, when detecting that a vehicle is in a self-piloting mode and a preset parking control condition is satisfied, a parking switching request message, and sending the parking switching request message to a Vehicle Control Unit (VCU);
receiving a parking switching message fed back by the VCU, the parking switching message being a message generated when the VCU detects that a vehicle state is executable for parking switching;
generating a parking switching signal corresponding to the parking switching message; and
pushing the parking switching signal to an external Electrical Park Brake (EPB) system, the parking switching signal being used to switch a state of the external EPB system, the state of the external EPB system comprising a tightening state and a releasing state;
the method further comprises:
controlling, when a Self-piloting Control Unit (SCU) detects that a preset emergency brake condition is satisfied, the SCU to generate an emergency brake request and send the emergency brake request to the VCU;
recording, by the VCU, a duration of the emergency brake request;
controlling, when the duration of the emergency brake request is greater than a preset emergency brake time threshold, the VCU to detect the vehicle state;
controlling, when the VCU detects that the vehicle state is executable for parking switching, the VCU to send an emergency brake message to a brake controller, so that the brake controller enters a brake working state; and
controlling, when the VCU detects that a current speed of the vehicle is smaller than a preset emergency parking speed, the VCU to send a tightening control signal to the EPB system, the tightening control signal being used to control the EPB system to enter a tightening state.

2. The method as claimed in claim 1, wherein the step of generating, when detecting that the vehicle is in the self-piloting mode and the preset parking control condition is satisfied, the parking switching request message and sending the parking switching request message to the VCU comprises:
  detecting an operation state of the vehicle, and determining a piloting mode of the vehicle according to the operation state;
  judging, when the vehicle is in the self-piloting mode, whether parking switching control is required according to a running state of the vehicle; and
  generating, when the judgment result is that the parking switching control is required, the parking switching request message, and sending the parking switching request message to the VCU.

3. The method as claimed in claim 2, wherein the step of judging, when the vehicle is in the self-piloting mode, whether the parking switching control is required according to the running state of the vehicle comprises:
  acquiring, when the vehicle is in the self-piloting mode, the running state of the vehicle; and
  setting, when the running state of the vehicle is a brake state or a starting state, the judgment result as that the parking switching control is required for the vehicle.

4. The method as claimed in claim 1, wherein the step of pushing the parking switching signal to the external EPB system comprises:
  starting, when pushing the parking switching signal to the external EPB system, a timer for timing;
  continuing to push the parking switching signal; and
  stopping, when a timing value reaches a preset delayed time value, pushing the parking switching signal.

5. The method according to claim 1, further comprising at least one of the following two steps:
  generating, when receiving an active switching message sent by the VCU, a corresponding active switching signal according to the active switching message, and pushing the active switching signal to the external EPB system, the active switching message being a message generated when the VCU monitors that the vehicle is in a brake state and the vehicle state is executable for parking switching; and
  sending, when the preset emergency brake condition is satisfied, the emergency brake request to the VCU, the emergency brake request being used to request the VCU to directly switch the state of the EPB system.

6. The method according to claim 1, further comprising at least one of the following two steps:
  recording, when receiving an external control message, a duration of the external control message, and when the duration of the external control message exceeds a preset misoperation time threshold, proceeding to the step of generating the parking switching request message; and
  generating, when detecting that the vehicle is in a manual piloting mode and the external control message is received, a corresponding external switching signal according to the external control message, and pushing the external switching signal to the external EPB system, the external switching signal being used to switch the state of the external EPB system.

7. A non-transitory computer-readable storage medium, having a computer program stored thereon, wherein when the computer program is executed by a processor, the processor is enabled to perform the steps of the method as claimed claim 1.

8. A computer device, comprising a memory and a processor, the memory storing a computer program, wherein when the computer program is executed by the processor, the processor is enabled to perform the steps of the method as claimed in claim 1.

9. An electrical parking control method, comprising:
  controlling, when a Self-piloting Control Unit (SCU) detects that a vehicle is in a self-piloting mode and a preset parking control condition is satisfied, the SCU to generate a parking switching request message and send the parking switching request message to a Vehicle Control Unit (VCU);
  controlling the VCU to detect a vehicle state when receiving the parking switching request message;
  controlling, when the VCU detects that the vehicle state is executable for parking switching, the VCU to generate a parking switching message and send the parking switching message to the SCU;
  controlling, when receiving the parking switching message, the SCU to generate a parking switching signal corresponding to the parking switching message; and
  controlling the SCU to push the parking switching signal to an external Electrical Park Brake (EPB) system, the parking switching signal being used to switch a state of the external EPB system, the state of the external EPB system comprising a tightening state and a releasing state;
  the method further comprises:
  controlling, when the SCU detects that a preset emergency brake condition is satisfied, the SCU to generate an emergency brake request and send the emergency brake request to the VCU;
  recording, by the VCU, a duration of the emergency brake request;
  controlling, when the duration of the emergency brake request is greater than a preset emergency brake time threshold, the VCU to detect the vehicle state;
  controlling, when the VCU detects that the vehicle state is executable for parking switching, the VCU to send an emergency brake message to a brake controller, so that the brake controller enters a brake working state; and
  controlling, when the VCU detects that a current speed of the vehicle is smaller than a preset emergency parking speed, the VCU to send a tightening control signal to the EPB system, the tightening control signal being used to control the EPB system to enter a tightening state.

10. The method according to claim 9, further comprising:
  controlling, when the VCU detects that the vehicle is in a brake state and the vehicle state is executable for parking switching, the VCU to send an active switching message to the SCU;
  controlling, when receiving the active switching message, the SCU to generate a corresponding active switching signal; and
  controlling the SCU to push the active switching signal to the external EPB system, the active switching signal being used to switch the state of the external EPB system.

* * * * *